United States Patent
Sato

(10) Patent No.: US 6,825,141 B2
(45) Date of Patent: Nov. 30, 2004

(54) MOLD-PRESS FORMING GLASS WHICH IS NOT FUSED TO A MOLD AND A METHOD OF PRODUCING THE SAME

(75) Inventor: Fumio Sato, Moriyama (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 10/281,499

(22) Filed: Oct. 28, 2002

(65) Prior Publication Data

US 2003/0094013 A1 May 22, 2003

(30) Foreign Application Priority Data

Oct. 29, 2001 (JP) ........................................ 2001-330305

(51) Int. Cl.$^7$ .............................................. C03C 3/083
(52) U.S. Cl. .................. 501/63; 65/29.11; 65/DIG. 13; 501/68
(58) Field of Search .............................. 65/29.1, 29.11, 65/DIG. 13; 501/63, 68

(56) References Cited

U.S. PATENT DOCUMENTS 5,430,573 A * 7/1995 Araujo et al. ............... 359/361
5,691,256 A * 11/1997 Taguchi et al. ............... 501/63
6,599,853 B2 * 7/2003 Sugimoto et al. ............. 501/50

FOREIGN PATENT DOCUMENTS

| JP | 3-37130 | * | 2/1981 |
| JP | 62-123040 | * | 6/1987 |
| JP | 5-193979 | * | 8/1993 |
| JP | 8-26765 | * | 1/1996 |
| JP | 8-26766 | * | 1/1996 |
| JP | 10-226532 | * | 8/1998 |
| JP | 2000-1329 | * | 1/2000 |
| JP | 2001-89183 | * | 4/2001 |

OTHER PUBLICATIONS

"Basicity", Hackh's Chemical Dictionary Fourth Edition, pp. 80–81, 1972.*

* cited by examiner

Primary Examiner—Sean Vincent
(74) Attorney, Agent, or Firm—Collard & Roe, P.C.

(57) ABSTRACT

A candidate composition is prepared. For the candidate composition, the basicity was calculated. With reference to the basicity thus calculated, the fusibility with a mold is evaluated. With reference to the result of evaluation, the composition is determined. A glass material is prepared to have the determined composition, melted, and formed. Thus, a mold-press forming glass having the basicity adjusted to be equal to 11 or less is produced.

16 Claims, No Drawings

MOLD-PRESS FORMING GLASS WHICH IS NOT FUSED TO A MOLD AND A METHOD OF PRODUCING THE SAME

BACKGROUND OF THE INVENTION

This invention relates to a mold-press forming glass and a method of producing the same. Throughout the specification, the term "mold-press forming glass" means a glass for use as a material to be press formed into a glass product by the use of a mold.

A mold-press forming method of forming a glass material into a glass product is a method capable of obtaining the glass product having a high surface accuracy without requiring a cutting operation and a polishing operation. The mold-press forming method is often used in production of an aspheric lens, a substrate for a magnetic recording medium, and the like. Production of the glass product by the mold-press forming method is carried out in the following manner. In a mold having a mold shape obtained by precision working, the glass material is heated to a temperature at which the glass material is softened and deformed. Thereafter, the glass material is press formed to produce the glass product with the mold shape transferred thereto.

The mold used in mold-press forming is selected so as to meet the following requirements. That is, the mold can be subjected to precision working at a high surface accuracy and is not changed at a molding temperature. As a material of the mold, cemented carbide such as WC (tungsten carbide) is predominantly used. In a case using WC as the material of the mold, Co, Ni, or Cr is often used as a binder. In view of corrosion resistance, sintering may be carried out by the use of a small amount of TiC or TaC.

When used under a high-temperature condition, the mold may be made of a ceramic material such as SiC. In case where SiC is used as the material of the mold, the mold is subjected to surface polishing after sintering. In order to further improve the surface accuracy, surface voids or recesses of the mold may be buried by CVD.

Depending upon the pressing condition and the type of the molded product, various types of SUS (Steel Use Stainless) may be selected.

In order to improve the quality of the product and the mass producibility in mold-press forming, it is essential that the mold and the glass are not fused or fusion-bonded to each other. Furthermore, it is important that, even after repeated use, the surface accuracy of the mold is kept.

However, depending upon the species of the glass, the mold and the glass may be fused to each other after repeated use or, in an extreme case, after a single cycle of forming. If the glass and the mold are fused, the glass is adhered to the surface of the mold. In this event, production may become impossible or, if production can be continued, the surface accuracy of the mold is degraded so that a product exactly as designed can not be obtained. Therefore, in order to improve the quality of the product and the mass producibility, it is important to use a glass which is not fused to the mold.

In order to prevent the glass from being fused, use is practically made of a method of coating the surface of the mold with a releasing or separating film. For example, the releasing film is made of a material selected from pure metal, such as Cr, Ni, W, Pt, Ir, and Au, an alloy or a carbide thereof, C, TiCN, TiAlN, TiN, and BN. However, it is desired to carry out mold-press forming without coating the mold with the parting film.

SUMMARY OF THE INVENTION

It is therefore an object of the present invention to provide a mold-press forming glass which is not fused to a mold during mold-press forming.

It is another object of the present invention to provide a mold-press forming glass which is free from reliance or dependence upon a mold and which does not require a parting film to be formed on the mold, thereby reducing a production cost.

It is still another object of the present invention to provide a mold-press forming glass capable of improving the mass producibility of mold-press forming so that press products can be produced at a low cost.

It is yet another object of the present invention to provide a mold-press forming glass capable of providing a product having a high surface accuracy.

Other objects of the present invention will become clear as the description proceeds.

In order to achieve the above-mentioned objects, the present inventor has made extensive studies and researches to find out that the basicity of the glass essentially dominates occurrence of fusion and hereby proposes the present invention.

According to an aspect of the present invention, there is provided a mold-press forming glass having the basicity adjusted to be equal to 11 or less.

According to another aspect of the present invention, there is provided a method of evaluating a mold-press forming glass. The evaluating method comprises the steps of preparing a candidate composition, calculating the basicity of the candidate composition as a calculated basicity, and evaluating the fusibility with a mold with reference to the calculated basicity.

According to still another aspect of the present invention, there is provided a mold-press forming glass evaluated by the evaluating method.

According to yet another aspect of the present invention, there is provided a method of designing a mold-press forming glass. The designing method comprises the steps of preparing a candidate composition, calculating the basicity of the candidate composition to produce a calculated basicity, evaluating the fusibility with a mold with reference to the calculated basicity to produce an evaluation result, and determining a glass composition for the mold-press forming glass with reference to the evaluation result.

According to a further aspect of the present invention, there is provided a mold-press forming glass designed by the designing method.

According to a still further aspect of the present invention, there is provided a method of producing a mold-press forming glass. The producing method comprises the steps of preparing a candidate composition, calculating the basicity of the candidate composition to produce a calculated basicity, evaluating the fusibility with a mold with reference to the calculated basicity to produce an evaluation result, determining a glass composition for the mold-press forming glass with reference to the evaluation result, preparing a material having the glass composition, melting the material into a molten material, and forming the molten material into a predetermined shape.

According to a yet further aspect of the present invention, there is provided a mold-press forming glass produced by the producing method.

In this invention, the basicity is defined by (Total Mole Number of Oxygen Atoms)/(Total Field Strength of Cations)×100. "Field Strength" (hereinafter abbreviated to F.S.) in the formula is given by:

$$F.S.=Z/r^2,$$

where Z represents the ionic valence, r, the ionic radius. For the values of Z and r in this invention, reference is made to "Chemical Handbook, Basic, 2nd Edition (1975. published by Maruzen)".

Calculation of the basicity of the glass will be described in conjunction with $SiO_2$ by way of example.

At first, the mole number of oxygen atoms is calculated. 1 mol of $SiO_2$ contains 2 mol of oxygen atoms. By multiplying 2 mol as the mole number of oxygen atoms by mol % of $SiO_2$ in glass composition, the mole number of oxygen atoms of $SiO_2$ in the glass is calculated. Likewise, calculation of the mole number of oxygen atoms is calculated for each component. The total sum of the mole numbers is represented by "Total Mole Number of Oxygen Atoms".

Next, F.S. is calculated. For a cation $Si^{4+}$, Z=4 and r=0.4. As a result, F.S.=25. Since 1 mol of $Si^{4+}$ is contained in 1 mol of $SiO_2$, F.S. in the glass is obtained by 25×1 (mol)×(mol % of $SiO_2$ in the composition).

Similarly, F.S. is calculated for each component. The total sum is represented by "Total F.S. of Cations". Thus, "Total Mole Number of Oxygen Atoms" divided by "Total F.S. of Cations" multiplied by 100 gives "Basicity of Glass".

Description will be made of a mechanism that the basicity of the glass dominates occurrence of fusion.

The basicity of the glass serves as an index representing the degree of attraction of oxygen electrons in the glass by cations in the glass. In the glass high in basicity, attraction of oxygen electrons by the cations in the glass is weak. When the glass high in basicity is contacted with cations which have strong motivation to require electrons and are included in the mold, the cations easily enter from the mold into the glass, as compared with a glass low in basicity. In case where the cations as the mold component enter or diffuse into the glass, the concentration of the mold component in a glass phase near an interface or boundary between the mold and the glass is increased. In this event, the difference in composition between the glass phase and the mold phase is reduced so that the affinity between the glass and the mold is increased. Accordingly, the glass is easily wet with the mold. It is believed that the glass is fused to the mold by the above-mentioned mechanism. Thus, as the basicity is lower, the mold component less easily enters into the glass so that the occurrence of fusion between the glass and the mold component is avoided.

In case where WC is used as the mold, the fusion is not caused to occur if the basicity of the glass is not higher than 11, preferably, not higher than 9.5. If the basicity of the glass exceeds 9.5, the glass tends to be fused with the mold. If the basicity of the glass exceeds 11, the glass is fused with the mold. In this event, the surface accuracy of the product is degraded and the mass producibility is significantly decreased.

DESCRIPTION OF THE PREFERRED EMBODIMENT

Now, description will be made of methods of evaluating, designing, and producing a mold-press forming glass according to an embodiment of this invention.

At first, preparation is made of a candidate composition of a glass, which would satisfy desired characteristics, such as a refractive index, dispersion, and a glass transition point. In particular, in order to carry out mold-press forming in a good condition, the candidate composition preferably has a glass transition point not higher than 800° C. Specifically, if the mold is exposed to a high temperature during mold-press forming, various problems tend to occur, for example, grain boundary cracks due to growth of surface crystal grains and occurrence of fusion due to promotion of diffusion of a mold component into the glass. In order to avoid these problems, it is effective to lower the press temperature (mold temperature) to a level not higher than 800° C. Therefore, it is desired to design the glass so that the glass transition point is not higher than 800° C. The glass transition point is a temperature of the glass corresponding to about $10^{13}$ poises as a press-formable limit viscosity. In case of the glass such that transition point is higher than 800° C., the glass must be heated to a high temperature higher than 800° C. In this event, the temperature difference is caused between the glass and the mold which is kept at about 800° C. so as to prevent deterioration in quality. As a result, during the process of cooling and solidifying the glass, the temperature difference is produced between the surface and the interior of the glass. This brings about occurrence of a surface defect, called sink marks, such that the glass is considerably shrunk with respect to a predetermined shape. As a consequence, the surface accuracy is degraded.

The glass composition is not particularly limited. However, it is preferable to select a glass free from a hazardous component such as PbO. Specifically, it is preferable to select a glass having a composition of, by mass %, 1–60% $SiO_2$, 0–40% $Al_2O_3$, 0–40% $B_2O_3$, 0–40% $P_2O_5$, 0–30% $R^1O$ ($R^1$ representing alkaline earth metal), 0–50% ZnO, 0–20% $R^2O$ ($R^2$ representing alkali metal), 0–20% $TiO_2$, 0–10% $ZrO_2$, and 0–40% $La_2O_3$.

Next, calculation is made of the basicity of the candidate composition. The basicity may be calculated by the use of an information processing apparatus programmed to execute a predetermined calculation. For example, the information processing apparatus is supplied with the candidate composition and calculates the total F.S. of cations from F.S. of each cation preliminarily memorized. By the use of the total F.S., the basicity is calculated and produced. The program of the type may be memorized in an information memory medium such as a CD-ROM.

Then, fusibility with the mold is evaluated with reference to the basicity thus calculated. In evaluation, it is confirmed whether or not the basicity exceeds a predetermined value. If the basicity exceeds the predetermined value, it is judged that the glass will be fused with the mold. If the basicity is not higher than the predetermined value, it is judged that the glass will not be fused with the mold. If the mold is made of WC, the predetermined value is equal to 11. preferably, 9.5. The predetermined value may appropriately be changed depending upon the pressing condition and the material of the mold. Like the calculation of the basicity, the evaluation can be processed by the use of the information processing apparatus. For example, the predetermined value is set in a computer program. The program is configured to judge if the basicity calculated as mentioned above is not higher than the predetermined value and to produce the result of judgment. The program of the type may be memorized in an information memory medium such as a CD-ROM.

Subsequently, the composition is determined with reference to the above-mentioned result of evaluation.

If the basicity obtained as mentioned above is higher than the predetermined value (for example, 11) and it is judged that the glass will be fused to the mold, the composition is changed so that the basicity is not higher than the predetermined value.

If the calculated basicity is not higher than the predetermined value and it is judged that the glass will not be fused to the mold, the candidate composition can be adopted. In the latter case, the composition may be finely modified so as to further lower the basicity.

In case where a plurality of candidate compositions are present, one of the candidate compositions which has the basicity not higher than the predetermined value and which is judged not to be fused with the mold is selected and adopted as a selected candidate composition. In this case also, the selected candidate composition may be finely adjusted so that the basicity is further lowered. More particularly, any candidate composition having the basicity higher than 11 may be adopted after its composition is changed or modified so that the basicity is not higher than 11.

Hereinafter, description will be made of a method of lowering the basicity by changing the composition of the glass. The change in basicity is mainly influenced by the F.S. Specifically, if a component having a large F.S. is increased, the basicity tends to be lowered. On the contrary, if a component having a small F.S. is increased, the basicity tends to be elevated. Therefore, in order to lower the basicity of the glass, the ratio of $SiO_2$, $B_2O_3$, $P_2O_5$, $Al_2O_3$, or the like which has a relatively large F.S. is increased or the ratio of $Li_2O$, $Na_2O$, SrO, BaO, or the like having a relatively small F.S. is decreased.

Subsequently, a glass material is prepared to have a composition determined by the above-mentioned method.

Thereafter, the material is melted and formed into a predetermined shape. Thus, a mold-press forming glass having the basicity adjusted to be equal to 11 or less is obtained.

When the glass evaluated, designed, and produced as mentioned above is subjected mold-press forming, the mold component is hardly diffused into the glass. As described above, diffusion of the mold component into the glass is concerned with occurrence of fusion. For example, in case where mold-press forming is carried out in a forming mold comprising WC as a main component and if the diffusion of W reaches the depth greater than 10 μm, the glass and the mold are easily fused to each other. However, in the above-mentioned glass having the basicity adjusted to be equal to 11 or less, the diffusion of W into the glass tends to be 10 μm or less from the interface between the glass and the mold. Thus, the glass is hardly fused with the mold.

Hereinafter, this invention will be described in conjunction with various examples.

Table 1 shows candidate compositions (Samples Nos. 1–15) of the mold-press forming glass.

For each candidate composition, the basicity was calculated. Each of Samples Nos. 1–11 has the basicity not higher than 11 and is judged to be hardly fused if mold-press forming is carried out by the use of a WC mold. Each of Samples Nos. 12–15 has the basicity exceeding 11 and is judged to be easily fused if mold-press forming is carried out by the use of the WC mold.

TABLE 1

| Glass Composition | Sample No. | | | | | | | |
|---|---|---|---|---|---|---|---|---|
| | 1 | 2 | 3 | 4 | 5 | 6 | 7 | 8 |
| $SiO_2$ | 58.0 | 51.0 | 51.5 | 55.0 | 48.0 | 53.0 | 51.5 | 34.0 |
| $Al_2O_3$ | 2.4 | 2.2 | 2.4 | 2.0 | 1.8 | 3.0 | 1.4 | 3.0 |
| $B_2O_3$ | | 10.0 | 7.0 | 3.0 | | | 9.0 | 18.0 |
| CaO | | | | | | | | 8.0 |
| SrO | 7.8 | 5.0 | 8.9 | 7.1 | 6.8 | 6.8 | 7.5 | |
| BaO | 7.2 | 8.1 | 6.1 | 8.0 | 7.5 | 7.0 | 8.8 | 9.0 |
| ZnO | 6.8 | 6.9 | 5.7 | 6.7 | 7.2 | 7.3 | 0.5 | |
| $Li_2O$ | 8.9 | 8.5 | 8.2 | 8.6 | 9.0 | 8.5 | 7.9 | 6.7 |
| $Na_2O$ | 3.2 | 3.6 | 3.4 | 4.0 | 3.8 | 3.3 | 3.2 | 2.0 |
| $K_2O$ | | | 0.5 | | | | | |
| $P_2O_5$ | | | | | 10.0 | 5.0 | | |
| $TiO_2$ | 3.8 | 3.4 | 4.1 | 4.2 | 3.9 | 4.0 | | |
| $ZrO_2$ | 1.7 | 1.2 | 2.0 | 1.2 | 1.8 | 2.0 | | |
| $Sb_2O_3$ | 0.2 | 0.1 | 0.2 | 0.2 | 0.2 | 0.1 | 0.2 | 0.1 |
| $La_2O_3$ | | | | | | | 10.0 | 19.2 |
| $Ta_2O_3$ | | | | | | | | |
| $Gd_2O_5$ | | | | | | | | |
| $Nb_2O_5$ | | | | | | | | |
| Basicity | 10.22 | 8.87 | 9.31 | 9.82 | 9.27 | 9.71 | 8.80 | 8.35 |
| glass transition point (° C.) | 466 | 473 | 470 | 469 | 460 | 462 | 489 | 506 |
| fusion with mold | B | A | A | B | A | B | A | A |
| W diffusion depth (μm) | 6.25 | 0.00 | 0.00 | 2.23 | 0.00 | 1.02 | 0.00 | 0.00 |

| Glass Composition | Sample No. | | | | | | |
|---|---|---|---|---|---|---|---|
| | 9 | 10 | 11 | 12 | 13 | 14 | 15 |
| $SiO_2$ | 44.7 | 5.1 | 29.0 | 51.5 | 48.2 | 33.3 | 42.4 |
| $Al_2O_3$ | 4.0 | | 3.0 | 2.2 | 2.3 | — | 1.5 |
| $B_2O_3$ | 5.0 | 18.8 | 24.0 | — | — | 4.0 | — |
| CaO | 8.3 | | 4.5 | — | — | — | 1.0 |
| SrO | 8.1 | | | 8.0 | 8.1 | — | — |
| BaO | 8.0 | | 6.0 | 6.9 | 6.7 | 10.7 | 1.5 |
| ZnO | | 16.3 | | 7.1 | 6.9 | 3.9 | — |
| $Li_2O$ | 6.7 | 1.2 | 7.0 | 12.8 | 15.0 | 2.7 | 3.7 |

TABLE 1-continued

| | | | | | | | |
|---|---|---|---|---|---|---|---|
| Na₂O | 4.2 | | | 5.8 | 7.0 | 12.6 | 19.1 |
| K₂O | | | | — | — | 6.8 | 1.8 |
| P₂O₅ | | | | | | | |
| TiO₂ | | | | 3.5 | 4.0 | 18.2 | 28.8 |
| ZrO₂ | 3.4 | 2.8 | 3.2 | 2.1 | 1.8 | — | — |
| Sb₂O₃ | 0.1 | | 0.1 | 0.1 | — | 0.2 | 0.2 |
| La₂O₃ | 7.5 | 27.6 | 13.2 | | | | |
| Ta₂O₃ | | 17.0 | | | | | |
| Gd₂O₅ | | 11.2 | 10.0 | | | | |
| Nb₂O₅ | | | | — | — | 7.6 | — |
| Basicity | 10.05 | 9.31 | 7.77 | 11.03 | 11.52 | 11.70 | 12.44 |
| glass transition point (° C.) | 481 | 568 | 536 | 436 | 421 | 453 | 498 |
| fusion with mold | B | A | A | C | D | D | D |
| W diffusion depth (μm) | 3.05 | 0.00 | 0.00 | 11.25 | 18.75 | 19.50 | 21.05 |

Next, a glass material was prepared so that the glass has a composition of each of Samples Nos. 1–15. The glass material was melted at 1300–1500° C. for 3 to 5 hours by the use of a platinum crucible. A resultant glass melt was subjected to forming. Evaluation was made of the glass transition point, the fusibility with the mold, and the diffusion depth of W after contact with the mold.

The glass transition point was measured as follows. At first, the glass material was prepared and melted at 1300–1500° C. for 3 to 5 hours by the use of the platinum crucible. Thereafter, the glass melt was poured onto a carbon table, annealed, and formed into a cylindrical sample having a diameter of 5 mm and a height of 20 mm. By the use of a differential thermal analyzer, measurement was carried out. A thermal expansion curve obtained by the differential thermal analyzer had a low-temperature region and an abnormal expansion region. Straight portions of these regions are extended to intersect with each other at an intersecting point. The temperature corresponding to the intersecting point is obtained as the glass transition point.

The fusibility with the mold was evaluated in the following manner. At first, the glass material was prepared and melted at 1300–1500° C. for 3 to 5 hours by the use of the platinum crucible. Thereafter, the glass melt was poured onto a carbon table, annealed, and formed into a cylindrical sample having a diameter of 5 mm and a height of 5 mm. Next, the sample was stationarily placed on a WC mold, heated to 800° C. in a N₂ atmosphere, and held for 15 minutes. After heating, the sample was removed and the surface of the mold was observed in an area within a circle having a diameter of 5 mm to which the sample was contacted. The degree of fusion is classified into four ranks A to D as shown in Table 2. In this evaluation, it is understood that the ranks A and B represent no fusion while the ranks C and D represent occurrence of fusion.

TABLE 2

| Evaluation | Result of Observation |
|---|---|
| A | Both by naked eye observation and microscopic observation, no small piece of glass is observed and metallic glow is maintained. |
| B | By microscopic observation (×200), small pieces of glass are observed. By naked eye observation, no adhesion of glass is observed. |
| C | By naked eye observation, adhesion of glass is confirmed in less than 50% of an observed part. |
| D | By naked eye observation, adhesion of glass is confirmed in 50% or more of an observed part. |

The diffusion depth of W after contact with the mold was obtained as follows. The sample removed from the mold after heating was split along a longitudinal axis of the sample to expose a section from a mold contact surface towards the interior of the glass. The glass was subjected to the electron probe microanalysis (EPMA). From the result of analysis, the diffusion depth of W from the interface between the mold and the glass towards the interior of the glass was obtained.

As a result of the above-mentioned evaluation, Samples Nos. 1–11 having the basicity not higher than 11 are judged not to be fused with the mold. The diffusion depth of W was not greater than 6.25 μm. In particular, Samples Nos. 2, 3, 5, 7, 8, 10, and 11 having the basicity not higher than 9.31 have the fusibility rank A and are confirmed to be free from diffusion of the mold component towards the interior of the glass.

On the other hand, in Samples Nos. 12 to 15 having the basicity higher than 11, fusion with the mold was confirmed. The diffusion of W towards the interior of the glass reached the depth of 10 μm or more.

In the foregoing, description has been made of the method in which the composition having the basicity of 11 or less is adopted. However, this invention is not restricted to the above-mentioned method but may be implemented by a method of adopting the composition having the basicity exceeding 11 after it is modified so that the basicity is not higher than 11.

What is claimed is:

1. A mold-press forming glass containing, by mass, 1–60% SiO₂ and 0–4% Al₂O₃, and having a glass basicity equal to 11 or less, the glass basicity being defined as (total mole number of oxygen atoms/total field strength of positive ions)×100.

2. A method of evaluating a mold-press forming glass, comprising the steps of:

preparing a glass composition;

calculating the glass basicity of the glass composition, the glass basicity being defined as (total mole number of oxygen atoms/total field strength of positive ions)×100; and evaluating the fusibility of the glass composition with a mold on the basis of the calculated basicity.

3. The method according to claim 2, wherein the evaluating step comprises the steps of:

confirming whether of not the calculated basicity is higher than a predetermined value; and judging, only when the calculated basicity is higher than the predetermined value, that the glass composition will be fused with the mold.

4. The method according to claim 2, wherein the evaluating step comprises the steps of:
   confirming whether of not the calculated basicity is higher than a predetermined value; and
   judging, when the calculated basicity is not higher than the predetermined value, that the glass composition will not be fused with the mold.

5. The method according to claim 4, wherein the predetermined value is not higher than 11.

6. A mold-press forming glass containing, by mass, 1–60% $SiO_2$ and 0–4% $Al_2O_3$, and evaluated by the method according to claim 2.

7. A method of preparing a mold-press forming glass, comprising the steps of:
   preparing a glass composition;
   calculating the glass basicity of the glass composition, the glass basicity being defined as (total mole number of oxygen atoms/total field strength of positive ions)×X 100;
   evaluating the fusibility of the glass composition with a mold on the basis the calculated basicity to produce an evaluation result; and
   determining a glass composition for the mold-press forming glass on the basis of the evaluation result.

8. The method according to claim 7, wherein the evaluating step comprises the steps of:
   confirming whether or not the calculated basicity is higher than a predetermined value;
   determining when the calculated basicity is higher than the predetermined value, that the glass composition will be fused with the mold; and
   subsequently modifying the glass composition to make the basicity no higher than the predetermined value.

9. The method according to claim 7, wherein the evaluating step comprises the steps of:
   confirming whether or not the calculated basicity is higher than a predetermined value;
   determining, when the calculated basicity is not higher than the predetermined value that the glass composition will not be fused with the mold to indicate usefulness of the glass composition as a mold-press forming glass.

10. The method according to claim 9. wherein the predetermined value is not higher than 11.

11. A mold-press forming glass containing, by. mass, 1–60% $SiO_2$ and 0–4% $Al_2O_3$, and prepared by the method according to claim 7.

12. A method of producing a mold-press forming glass, comprising the steps of:
   preparing a glass composition;
   calculating the glass basicity of the glass composition, the glass basicity being defined as (total mole number of oxygen atoms/total field strength of positive ions)×100;
   evaluating the fusibility of the glass composition with a mold on the basis of the calculated basicity to produce an evaluation result;
   determining a glass composition for the mold-press forming glass on the basis of the evaluation result;
   preparing a material having the determined glass composition;
   melting the material into a molten material; and
   forming the molten material into a predetermined shape.

13. The method according to claim 12, wherein the evaluating step comprises the steps of:
   confirming whether or not the calculated basicity is higher than a predetermined value;
   determining when the calculated basicity is higher than the predetermined value that the glass composition will be fused with the mold; and
   subsequently modifying the glass composition, to make the basicity no higher than the predetermined value.

14. The method according to claim 12, wherein the evaluating step comprises the steps of:
   confirming whether or not the calculated basicity is higher than a predetermined value;
   determining when the calculated basicity is not higher than the predetermined value that the glass composition will not be fused with the mold to indicate usefulness of the glass composition as a mold-press forming glass.

15. The method according to claim 14, wherein the predetermined value is not higher than 11.

16. A mold-press forming glass containing, by mass, 1–60% $SiO_2$ and 0–4% $Al_2O_3$, and produced by the method according to claim 12.

* * * * *